(12) United States Patent
Forthuber

(10) Patent No.: US 6,224,355 B1
(45) Date of Patent: May 1, 2001

(54) CARBON DIOXIDE PUMP AND PUMPING SYSTEM

(75) Inventor: Frederick A. Forthuber, Houston, TX (US)

(73) Assignee: Occidental Permian Ltd., Houston, TX (US)

( * ) Notice: Subject to any disclaimer, the term of this patent is extended or adjusted under 35 U.S.C. 154(b) by 0 days.

(21) Appl. No.: 09/296,683

(22) Filed: Apr. 20, 1999

(51) Int. Cl.$^7$ .................................................... F04B 17/60
(52) U.S. Cl. .......................................................... 417/423.3
(58) Field of Search .......................... 417/423.3, 410.1; 166/268, 209; 299/4; 50/200; 415/501

(56) References Cited

U.S. PATENT DOCUMENTS

| | | | |
|---|---|---|---|
| 3,853,430 | * 12/1974 | O'Rourke | 417/360 |
| 4,212,354 | * 7/1980 | Guinn | 166/303 |
| 4,235,289 | 11/1980 | Weeter | 166/267 |
| 4,250,965 | 2/1981 | Wiseman, Jr. | 166/305 R |
| 4,378,047 | * 3/1983 | Elliott et al. | 166/68 |
| 4,589,486 | * 5/1986 | Brown et al. | 166/252.1 |
| 4,607,699 | 8/1986 | Stephens | 166/303 |
| 4,615,389 | 10/1986 | Neely et al. | 166/250 |
| 4,631,006 | 12/1986 | Murray | 417/234 |
| 4,648,811 | 3/1987 | Tahata et al. | 417/410 |
| 4,768,888 | * 9/1988 | McNaull | 384/129 |
| 5,080,169 | * 1/1992 | Davis | 166/268 |
| 5,367,214 | * 11/1994 | Turner, Jr. | 310/87 |
| 5,571,001 | * 11/1996 | Fukuda et al. | 417/423.3 |
| 5,628,616 | * 5/1997 | Lee | 415/58.2 |
| 5,992,517 | * 11/1999 | McAnally | 166/105 |

FOREIGN PATENT DOCUMENTS

WO98/13579  4/1998  (WO) ............................. E21B/43/38

OTHER PUBLICATIONS

International Search Report dated Jul. 13, 2000 for International Application No. PCT/US/10178 filed Apr. 14, 2000.

* cited by examiner

Primary Examiner—Teresa Walberg
Assistant Examiner—Daniel Robinson
(74) Attorney, Agent, or Firm—Locke Liddell & Sapp

(57) ABSTRACT

There is disclosed a pump and pumping system for pumping dense phase gases, specifically for injecting carbon dioxide into an oil or gas reservoir that includes a pump, a motor, and a casing in which the pump and motor reside. There is also disclosed a pump and pumping system for injecting dense phase greenhouse gases into a reservoir or underwater. The pump may include a downhole electric submersible pump.

13 Claims, 3 Drawing Sheets

CARBON DIOXIDE PUMP AND PUMPING SYSTEM

FIELD OF THE INVENTION

This invention generally relates to a pump and pumping system, particularly for carbon dioxide, and more particularly to a pump and pumping system for injecting dense phase carbon dioxide into an oil or gas reservoir. This invention can also be used to pump greenhouse gases such as carbon dioxide, methane, nitrous oxide, or chlorofluorocarbons that can exist in a dense phase and dispose of the gases underground or underwater as applicable. In addition, this invention can be used to pump any gas which can exist in a dense phase.

BACKGROUND OF THE INVENTION

Contrary to popular belief, the United States still has enormous oil resources. Right now, more than 135 years after the birth of the U.S. oil industry, the nation has twice as much oil remaining in its reservoirs as it has so far produced. For every barrel of oil produced to date, two barrels have been left behind. The U.S. oil industry has produced almost 160 billion barrels, but some 350 billion barrels remain as the target of improved oil technologies. Most of this remaining oil, however, is hard to produce. Locked in complex geologic structures, bypassed by conventional technologies, or simply beyond the capability of today's recovery processes, this oil remains elusive.

There are a number of enhanced oil recovery systems available for increasing production from oil and gas reservoirs. These include steam injection, carbon dioxide and/or nitrogen gas flooding, waterflooding with chemicals such as polymers, surfactants, and alkalines, and the use of microbes to produce gases or chemicals underground that increase the mobility of remaining oil.

One of the more popular enhanced recovery systems in the greater Permian Basin area of West Texas and Southeast New Mexico is carbon dioxide ("CO2") flooding. Carbon dioxide flooding has proven to be among the most promising enhanced oil recovery methods for the United States because it takes advantage of plentiful, naturally-occurring carbon dioxide. When CO2 is injected into a reservoir above its minimum miscibility pressure (a miscible flood), the gas acts as a solvent. The CO2 picks up lighter hydrocarbon components, swelling the total volume of oil and reducing the oil's viscosity so that it flows more easily. When a field has already been waterflooded, a tertiary CO2 flood will normally provide incremental recovery of about 8% to about 16% of the original oil in place. When CO2 is used instead of waterflood for secondary recovery, the field can produce up to about 40% of the original oil in place.

Usually, CO2 flooding involves the use of CO2 at existing pipeline pressures, and then injecting the CO2 into the field. When existing pipeline pressures are not high enough to inject the CO2 into the reservoir, the CO2 pressure is boosted with a CO2 pump. Existing dense phase CO2 booster pumping technology uses multistage centrifugal or reciprocating pumps with expensive, double mechanical seals in conjunction with high pressure seal oil systems and seal oil cooling systems. This type of prior art pumping system is typically custom built and housed within large support buildings. Consequently, this type of pumping system is costly, uses large amounts of space, is overly complicated, requires considerable maintenance, and is very time consuming to repair or replace. For the foregoing reasons, there is a need for an improved CO2 pump and pumping system.

SUMMARY OF THE INVENTION

The present invention is directed to a pump and pumping system for injecting dense phase carbon dioxide into an oil or gas reservoir and for injecting dense phase greenhouse gases such as carbon dioxide, methane, nitrous oxide, or chlorofluorocarbons into a reservoir or underwater.

In one aspect, the invention comprises a downhole electric pump, a motor, and a casing in which the pump and motor are encased or reside, for boosting carbon dioxide or any other dense phase gas. The apparatus has a power source and at least one power lead that connects between the motor and the power source. In another aspect, the invention comprises a method for pumping dense phase gas that involves inserting the casing within an existing piping system by connecting the discharge flange and inlet flange of the piping system with the opposing flanges of the casing. The gas that is pumped by the pump and motor within the casing may be dense phase carbon dioxide gas or any dense phase greenhouse gas.

Among other advantages, the present invention does not require the use of expensive mechanical seals or their associated seal oil systems, does not require large support buildings, and can be maintained, repaired, or replaced easily and inexpensively.

The foregoing has outlined rather broadly the features and technical advantages of the present invention so that the detailed description of the invention that follows may be better understood. Additional features and advantages of the invention will be described hereinafter which form the subject of the claims of the invention. It should be appreciated by those skilled in the art that the conception and the specific embodiment disclosed may be readily used as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The accompanying drawings, which are incorporated in and form a part of the specification, illustrate the embodiments of the present invention, and, together with the description, serve to explain the principles of the invention. In the drawings.

It is to be noted that the drawings illustrate only typical embodiments of the invention and are therefore not to be considered limiting of its scope, for the invention will admit to other equally effective embodiments.

DETAILED DESCRIPTION OF THE INVENTION

The present invention relates to a pump and pumping system for injecting dense phase or supercritical carbon dioxide into an oil or gas reservoir. In general, the system involves the use of a downhole electric submersible pump with an appropriate motor encased in a piece of pipe or casing that is placed in an existing surface CO2 pipeline or piping system. Among other advantages, the use of an electric submersible pump does not require the use of mechanical seals or their associated seal oil systems.

Figure 1:
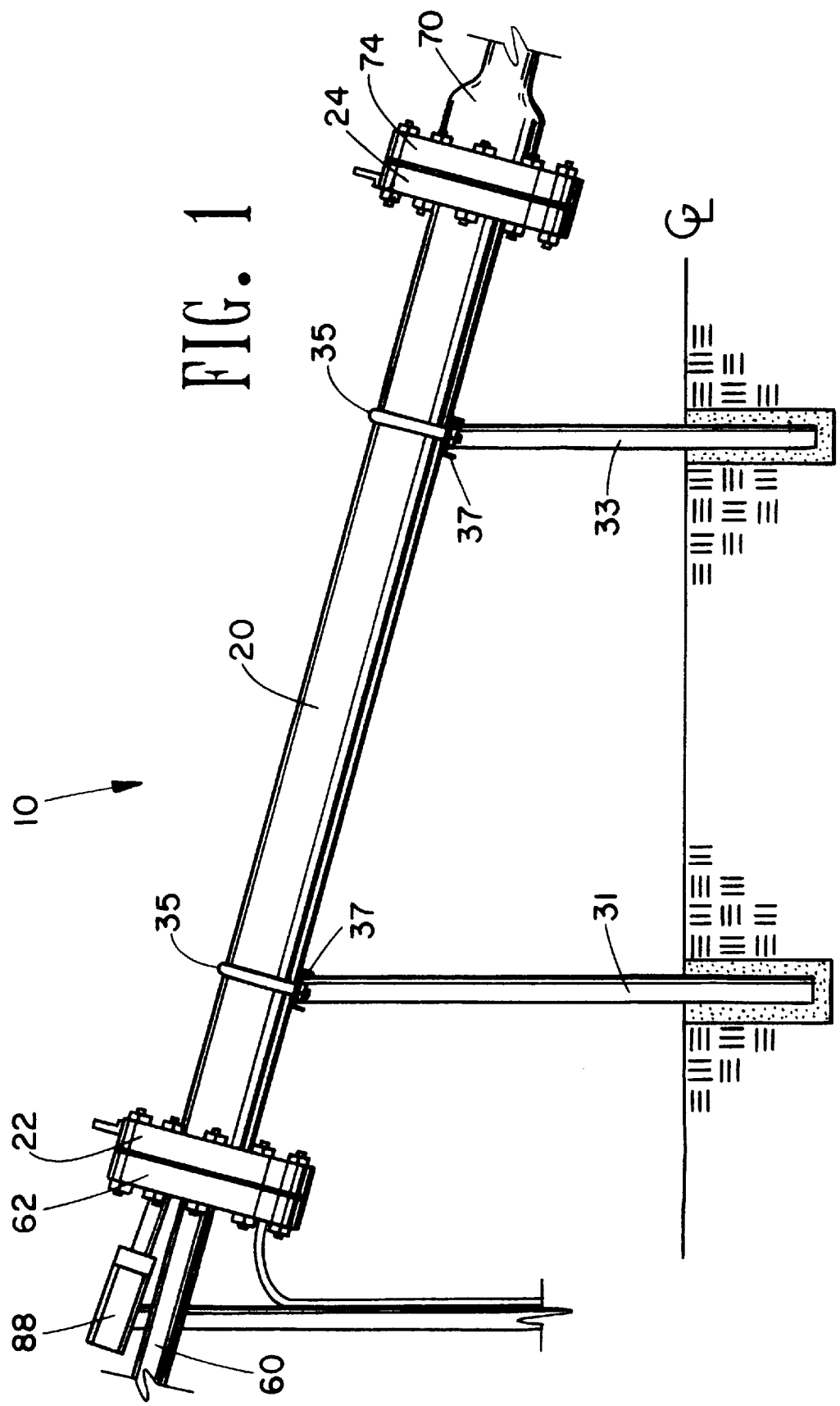
FIG. 1 shows a front view of a pumping system of the present invention in its operating environment.

FIG. 1 shows a front view of a pumping system 10 of the present invention in its operating environment. The pumping system 10 includes a pipe or casing 20 that is placed in-line on an existing pipeline shown in part by inlet piping 70 and discharge piping 60. The casing 20 has flanges 22 and 24 that are connected to the discharge piping flange 62 and the inlet piping flange 74, respectively, with a plurality of nuts and bolts. The casing and flanges may be manufactured of any suitable material capable of withstanding the operating parameters of the invention, such as metals, fiberglass, plastics, or advanced composites of epoxy resins reinforced with continuous high-strength, low-density fibers with a thermoplastic lining. The pumping system 10 may be isolated by one or more valves (not shown) upstream or downstream of the piping 70 and 60.

Although not required, the casing 20 can be supported by one or more beams, here 31 and 33, planted securely in the ground. The casing 20 is fastened to the beams 31 and 33 by u-shaped bars 35 and brackets 37 that encircle the casing 20. The u-shaped bars 35 and brackets 37 may be tightened around the casing 20 by using nuts on the threaded ends of the bars, or by any other fastener means known in the art. Although FIG. 1 shows beam 31 being longer than beam 33 resulting in a slightly-off horizontal orientation (about 15 degrees off the horizon), the pumping system or casing orientation may be horizontal, vertical, or any direction between to fit the existing pipeline or pipeline system.

Figure 2:
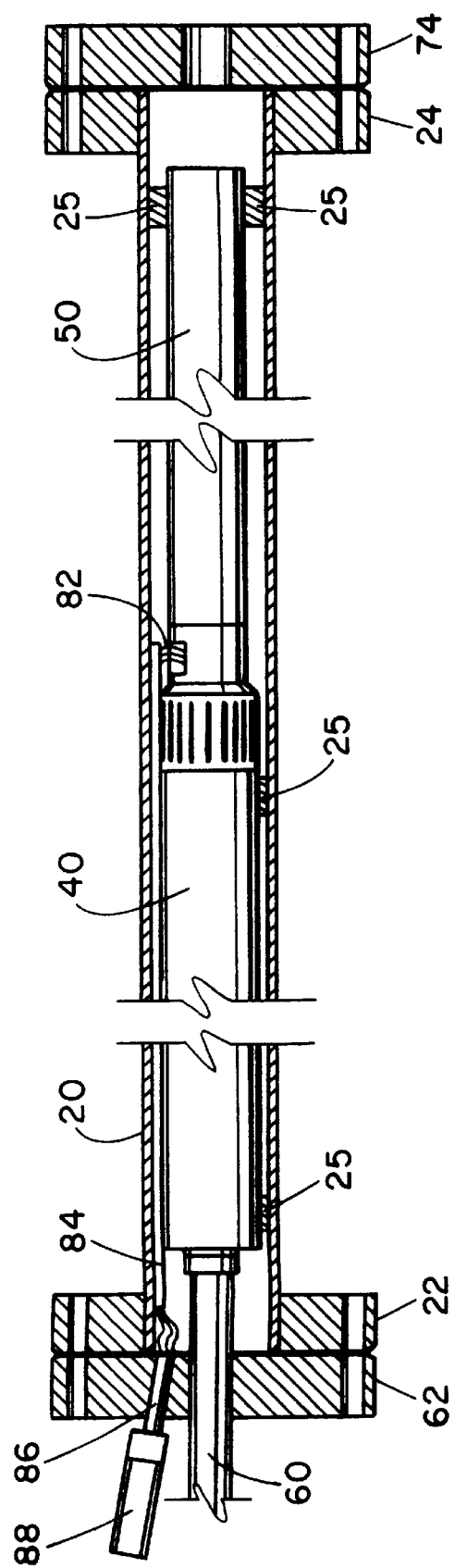
FIG. 2 shows a cross section of a front view of a pumping system of the present invention illustrating the basic components.

There is shown in FIG. 2 a cross section front view of a pumping system 10 illustrating the basic components of an apparatus of the present invention. The pumping system 10 comprises the pipe or casing 20, with flanges 22 and 24, a pump 40, and a motor 50.

The casing 20 may be any suitable dimension needed to encase the pump 40 and motor 50 of interest. More specifically, the casing 20 may be any suitable dimension as long as the velocity of the CO2 passing over the outside of the motor is sufficient to absorb the heat rejected from the motor (from about 1.0 to about 7.0 feet per second). In the example discussed below, the casing 20 has an inside diameter of about 5.5 inches and a length of about 10 feet. If desired, the casing 20 may have a plurality of centralizers 25 for centering the pump 40 and motor 50 within its internal diameter. Depending upon its construction, the casing 20 is capable of connecting with any size of inlet or discharge piping. In the example discussed below, the casing 20 is connected with a 6-inch pipe that serves as the inlet piping 70 and a 2-inch pipe that serves as the discharge piping 60. The flanges 24 and 74 are ANSI 900 Class raised-face welded neck flanges. The flanges 22 and 62 are ANSI 900 Class ring type joint welded neck flanges. The flanges 22, 24, 62, and 74 can be either slip-on, socket welded, lapped, or welded neck flanges. The ring type joint welded neck flanges were used on the discharge end of the pump casing 22 and the pump discharge end connection 62 to aid in centering the pump and motor assembly.

The pump 40 may be any suitable downhole electric submersible pump of sufficient size to create the pressures of interest in the casing 20 selected. While such pumps are typically used downhole for pumping water, oil, and other fluids, the pump 40 of the present invention is used on the surface for pumping dense phase CO2. In contrast to other pumps such as centrifugal, turbine, reciprocal, or gear pumps that include single, tandem, double, or even triple mechanical seal arrangements, a downhole electric submersible pump lacks these expensive seals. In the example discussed below, the pump 40 has 35 stages, can generate approximately 1300 barrels per day (approximately 3,250 thousand cubic feet of dense phase CO2 depending on the purity and temperature of the CO2) at 270 psi of boost, and has an outer diameter of about 4.00 inches and a length of about 4.30 feet.

The motor 50 may be any suitable motor of sufficient horse power and voltage to drive the pump of interest in the casing selected. Depending upon the circumstances of use, the motor may range from about 1 to about 300 horsepower and from about 100 to about 2500 volts. In the example discussed below, the motor 50 is a 10 horsepower, 460 volt unit, with an outer diameter of about 3.75 inches and a length of about 3.85 feet.

The elastomeric components for the o-rings and seals for the pump 40 and motor 50 should be carefully selected to avoid explosive decompression problems. These problems arise when dense phase CO2 permeates the elastomers at high pressure. When the pressure is suddenly reduced, the CO2 cannot escape the elastomer before it flashes to vapor. The net result is explosive decompression. The o-rings used in the pump are a fluoroelastomer (AFLAS) material with a Shore A durometer hardness of 80±5 made by Seals Eastern, Inc. of Red Bank, N.J. The elastomers in the motor are standard materials by Franklin Electric of Bluffton, Ind. The motor leads are made of a nitrile rubber (Paracril) outer jacket with an ethylene propylene (EPDM) core and are also furnished by Franklin Electric.

The motor 50 has one or more power leads 82 that stretch from the motor 50 through a port 86 in the flange 62 to a power source. The power leads 82 can be protected with several types and combinations of armor, such as a hollow bar shown as 84. Any power lead suitable for the operating conditions of interest may be used. In the example discussed below, the motor 50 has three individual power leads that are about 12.50 feet long that run within a mini mandrel high-pressure pass-through 88 to the power source. A ground 89 may also be used.

Figure 3:
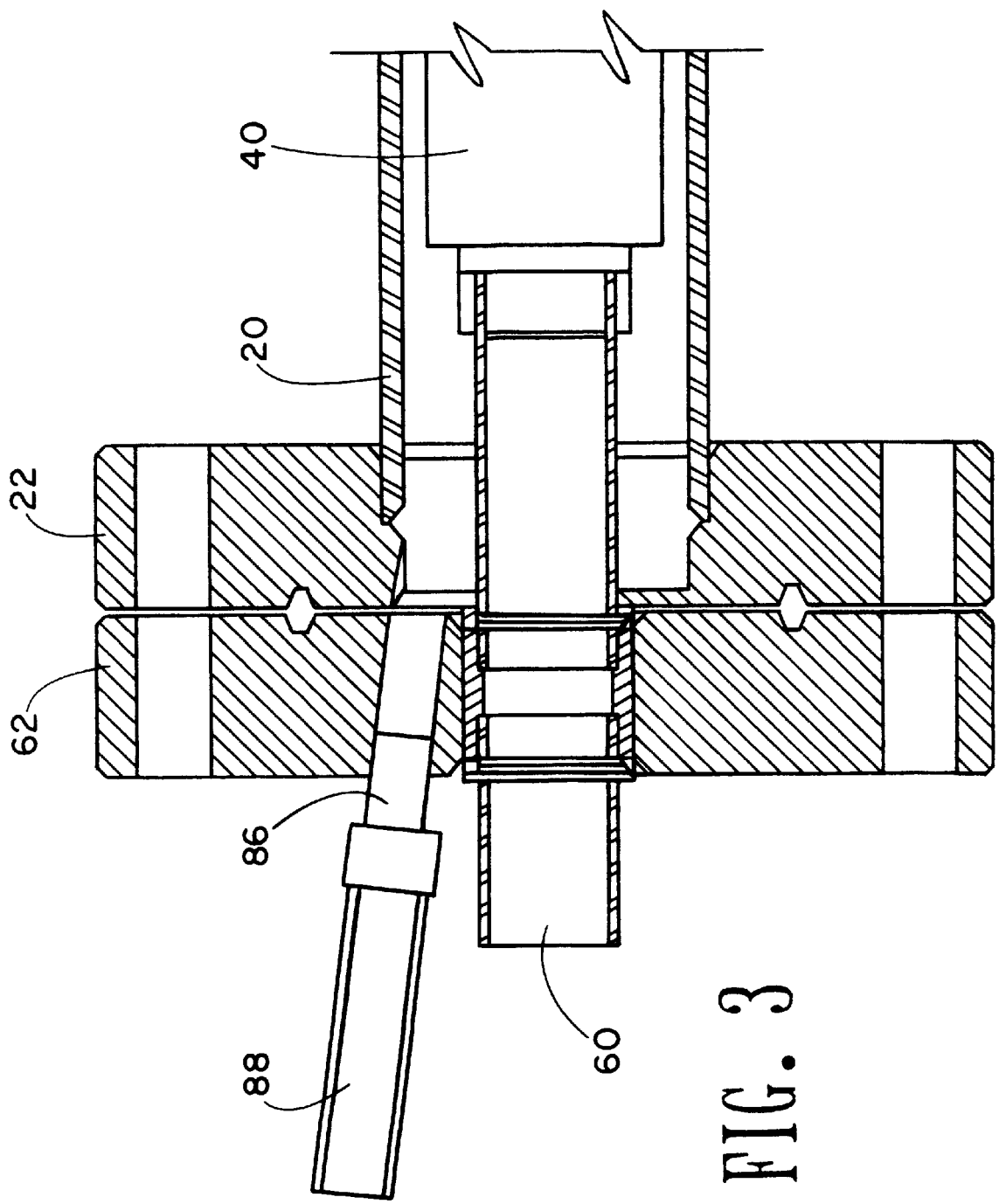
FIG. 3 shows a detailed cross section front view of a portion of a pumping system of the present invention.

Turning now to FIG. 3, there is shown a detailed cross section front view of a portion of a pumping system of the present invention. The electrical pass through shown as 86 and 88, also known as the potting assembly or mini mandrel, is used to seal around the individual power leads and prevent leakage of the dense phase CO2 in the pump casing to the atmosphere. The electrical pass through consists of a metal housing made of carbon steel or alloys such as 304 stainless steel or 316 stainless steel. The part of the pass through shown as 86 can be threaded or welded to the discharge flange of the pump shown as 62. The part of the pass through assembly shown as 88 is attached to 86 by means of a coupling nut with a female thread which attaches to a male thread on 86. Leakage of the dense phase CO2 between electrical pass through parts 86 and 88 is prevented by an o-ring and pipe threads. In addition, leakage of the dense phase CO2 around the power leads 82 is prevented with a combination of elastomer boots and a two-part epoxy which is impervious to CO2 permeation. The electrical pass through is an engineered product provided by EFT Systems, Inc. of Houston, Tex.

The carbon dioxide used as a secondary or tertiary recovery method in the present invention may be obtained from CO2 supply contracts, recovered from the field, or purified from a natural gas stream. For example, the movement of modest amounts of CO2 from the principal sources to the project site can be done by either bulk truck or rail tank car shipment. These commercial shipments are typically made at 300 psig and 0 degrees F. (liquid). Pipelines are used for larger volumes usually operating above the critical pressure of CO2. As a rule of thumb, to effectively and economically CO2 flood a field, the field should be large enough to have original oil in place of more than five million barrels, and have more than 10 producing wells. The field should also be in an area with an existing infrastructure of CO2 source fields and distribution pipelines. The CO2 injection pressure required for the reservoir is a site variable since miscibility pressure can range from about 1100 psig to about 5000 psig. This pressure varies depending upon the depth of the reservoir and the type of rock, among other things. For low pressures, injection can take place directly from the pipeline, while for higher pressures, the pressure must be increased on site.

In the example discussed below, the pipeline pressure of the carbon dioxide source ran from about 1750 psig to about 1910 psig, depending upon the CO2 recovery plant discharge pressure and CO2 usage from other pipeline customers. Moreover, because of the attributes of the field, it was necessary to boost the pressure of the carbon dioxide before injecting it into the field, to a pressure of about 2160 psig. Of course, an analysis of the well logs, core samples, maps, production data, well completion history, waterflood injection history, and other data available for the field may dictate other operating pressures.

The CO2 pumping system of the present invention has several advantages over prior art pumping systems such as cost, simplicity and ease of operation, availability and delivery, environmental, safety, and ease of installation. For example, the installed cost of the CO2 booster pump is approximately $200,000 less per installation versus typical industry installations. The self-contained pump and motor assembly does not require maintenance or special training for operating personnel. Likewise, all components used for the CO2 pump can be standard "off the shelf" items that do not have a long lead time for delivery. The type of CO2 booster pump can be ready for delivery two weeks after the receipt of the order versus 26 weeks or more for typical industry installations. Replacement of the entire pump assembly can be done in 48 hours or less. Besides dense phase carbon dioxide, this type of pump can be used for other environmentally sensitive liquids, as well as any gas which can exist in a dense phase, due to the lack of external seals. In addition, this pump can be used in higher pressures than other pumps without seals, namely magnetic drive pumps. The booster pump is also safe. Due to the lack of external seals, the danger posed by leaking seals is eliminated. The time required to install this type of pump is considerably less than that of competing technologies since it can be bolted between a set of flanges and does not require on-site precision alignment. Other pumping systems need to have the motor and pump aligned on-site for reliable operations. Another advantage is that the pump can be installed vertically and does not take up as much space as competing technologies.

The following example is a description of a field use of the pumping system of the present invention. It is offered for purposes of instruction to those skilled in the art and should not be considered as a limitation on the scope of the described invention as claimed.

EXAMPLE

The carbon dioxide pump of the present invention was used at Altura Energy Ltd.'s (a joint venture between Amoco Corporation and Shell Oil Company) South Wasson Clearfork Unit in Gaines County, Tex. Altura Energy needed to boost the pressure on a CO2 return line from a nearby natural gas plant to be able to reinject the CO2 into the field to enhance recovery.

The composition of the source CO2 was as follows:

| Component | Mole % | Volume % | Weight % |
|---|---|---|---|
| Nitrogen (N2) | 0.479 | 0.303 | 0.326 |
| Carbon Dioxide (CO2) | 87.873 | 86.333 | 93.887 |
| Methane (C1) | 8.185 | 7.997 | 3.188 |
| Ethane (C2) | 3.350 | 5.165 | 2.446 |
| Propane (C3) | 0.022 | 0.035 | 0.024 |
| i-Butane (iC4) | 0.024 | 0.045 | 0.034 |
| n-Butane (nC4) | 0.067 | 0.122 | 0.095 |

Other characteristics of the source CO2, the existing pump suction parameters, and other physical properties germane to this example are as follows:

a) Pump inlet pressure (psig)=1835 b) CO2 temperature range (deg F.)=from about +40 (winter) to about +80 (summer)

c) CO2 density (lb/cu. ft)=see following tables d) Specific gravity @ 60 deg F.=0.7522 e) Molecular Mass=41.190 f) Flow rate=3.5 million standard cubic feet per day CO2 mixture described above (converts to approximately 1,225. barrels per day)

The thermodynamic properties of the source CO2 at different pressures is as follows:

Thermodynamic Properties at P=1800.000 psia
Composition: N2 0.0048 CO2 0.8787 C1 0.0819 C2 0.0335 C3 0.0002 IC4 0.0002 C4 0.00007

| Temp deg F. | Z | Density lb/ft**3 | Enthalpy Btu/lb | Entropy Btu/lb.F | Cp Btu/lb.F | Cp/Cv |
|---|---|---|---|---|---|---|
| 40.000 | 0.27027 | 51.15966 | −3829.76 | 0.824 | 0.5649 | 2.5175 |
| 50.000 | 0.27529 | 49.24180 | −3823.90 | 0.836 | 0.5934 | 2.6339 |
| 60.000 | 0.28212 | 47.12495 | −3817.72 | 0.848 | 0.6797 | 2.7795 |
| 70.000 | 0.29147 | 44.75120 | −3811.12 | 0.861 | 0.6780 | 2.9720 |
| 80.000 | 0.30457 | 42.03296 | −3803.93 | 0.874 | 0.7453 | 3.2418 |

Thermodynamic Properties at P=1850.0000 psia
Composition: N2 0.0048 CO2 0.8787 C1 0.0819 C2 0.0335 C3 0.0002 IC4 0.0002 C4 0.0007

| Temp deg F. | Z | Density lb/ft**3 | Enthalpy Btu/lb | Entropy Btu/lb.F | Cp Btu/lb.F | Cp/Cv |
|---|---|---|---|---|---|---|
| 40.000 | 0.27685 | 51.33156 | −3829.89 | 0.824 | 0.5598 | 2.4980 |
| 50.000 | 0.28173 | 49.45156 | −3824.10 | 0.835 | 0.5865 | 2.6079 |
| 60.000 | 0.28835 | 47.38713 | −3817.99 | 0.847 | 0.6200 | 2.7430 |
| 70.000 | 0.29732 | 45.08913 | −3811.51 | 0.860 | 0.6635 | 2.9174 |
| 80.000 | 0.30969 | 42.48584 | −3804.50 | 0.873 | 0.7224 | 3.1545 |

Thermodynamic Properties at P=1900.0000 psia
Composition: N2 0.0048 CO2 0.8787 C1 0.0819 C2 0.0335 C3 0.0002 IC4 0.0002 C4 0.0007

| Temp deg F. | Z | Density lb/ft**3 | Enthalpy Btu/lb | Entropy Btu/lb.F | Cp Btu/lb.F | Cp/Cv |
|---|---|---|---|---|---|---|
| 40.000 | 0.28341 | 51.49877 | −3830.02 | 0.823 | 0.5550 | 2.4796 |
| 50.000 | 0.28817 | 49.65425 | −3824.28 | 0.835 | 0.5801 | 2.5836 |
| 60.000 | 0.29458 | 47.63822 | −3818.25 | 0.846 | 0.6110 | 2.7094 |
| 70.000 | 0.30321 | 45.40870 | −3811.86 | 0.858 | 0.6505 | 2.8685 |
| 80.000 | 0.31495 | 42.90638 | −3805.02 | 0.871 | 0.7025 | 3.0791 |

Thermodynamic Properties at P=2100.0000 psia
Composition: N2 0.0048 CO2 0.8787 C1 0.0819 C2 0.0335 C3 0.0002 IC4 0.0002 C4 0.0007

| Temp deg F. | Z | Density lb/ft**3 | Enthalpy Btu/lb | Entropy Btu/lb.F | Cp Btu/lb.F | Cp/Cv |
|---|---|---|---|---|---|---|
| 40.000 | 0.30947 | 52.12595 | −3830.48 | 0.821 | 0.5383 | 2.4140 |
| 50.000 | 0.31376 | 50.40409 | −3824.91 | 0.832 | 0.5581 | 2.4993 |
| 60.000 | 0.31947 | 48.55017 | −3819.13 | 0.843 | 0.5815 | 2.5977 |
| 70.000 | 0.32698 | 46.54063 | −3813.09 | 0.855 | 0.6096 | 2.7139 |
| 80.000 | 0.33680 | 44.34581 | −3806.72 | 0.867 | 0.6438 | 2.8554 |

The carbon dioxide pump used in this example was a D1400, 35 stages, downhole electric submersible pump manufactured by REDA (a Camco International Company) of Midland, Tex. The pump motor was an FN4 Series, 10 HP, 460V, High Temperature, Stripper Motor for severe duty service manufactured by Franklin Electric Company, Inc. of Bluffton, Ind. The pump and motor were modified to include a brass bushing pump base, bearing material made of graphalloy, and the addition of a thermoplastic centralizer just downstream of the pump intake. The centralizer reduced the unsupported length of the pump and motor assembly from about 8 feet to about 4 feet. The centralizer also reduced the deflection at the coupling between the pump and the motor that in turn extends the life of the seals and bearings on the pump and motor. The potting assembly for the pump motor was specially designed by EFT Systems, Inc. of Houston, Tex. to withstand CO2 permeation. B&M Tool Company of Midland, Tex. manufactured the CO2 booster discharge end connection 62. The end connection was machined out of 4130 material. The pump casing was fabricated by JPN Service Company of Denver City, Tex. and included a 6-inch Schedule 120 A106 Grade B seamless pipe for the outer casing, a 6-inch normalized A105 forged steel raised face welded neck flange with a Schedule 120 bore for the suction flange, and a 6-inch normalized A105 forged steel ring type joint welded neck flange with a Schedule 120 bore for the discharge flange.

The CO2 pump was tested with recycled CO2 at a pressure of 1910 psig at a suction and discharge pressure varying between 2060 psig and 2200 psig. The pump delivered approximately 1300 barrels of CO2 per day for 344 days. The total measured pump throughput for the 344 day runtime was 1.09 billion cubic feet of dense phase CO2.

Although the present invention and its advantages have been described in considerable detail, it should be understood that various changes, substitutions, and alterations can be made herein without departing from the spirit and scope of the invention as defined by the appended claims.

What is claimed is:

1. An apparatus for boosting dense phase carbon dioxide or any other dense phase gas comprising:

a pump, said pump having elastomers that are impervious to carbon dioxide permeation;

a motor, said motor having elastomers that are impervious to carbon dioxide permeation; and a casing, wherein said pump and motor reside.

2. The apparatus of claim 1 further comprising a power source.

3. The apparatus of claim 2 further comprising at least one power lead that connects between said motor and said power source.

4. The apparatus of claim 1 wherein said pump comprises a downhole electric submersible pump.

5. A method for pumping dense phase gas comprising:

inserting a casing in an existing pipeline;

wherein said pipeline has a discharge flange and an inlet flange;

wherein said casing has opposing flanges that are connected to said discharge flange and inlet flange, wherein said casing further has a pump and a motor for boosting the gas, said pump and motor having elastomers that are impervious to carbon dioxide permeation.

6. The method of claim 5 wherein said gas comprises carbon dioxide.

7. The method of claim 5 wherein said gas comprises a greenhouse gas.

8. An apparatus for boosting dense phase carbon dioxide or any other dense phase gas comprising:

a casing, said casing being inserted within an existing piping system;

a downhole electric pump, said pump being encased within said casing, said pump having elastomers that are impervious to carbon dioxide permeation; and a motor; said motor being encased within said casing and attached to said pump, said motor having elastomers that are impervious to carbon dioxide permeation.

9. The apparatus of claim 8 further comprising a power source.

10. The apparatus of claim 9 further comprising at least one power lead that connects between said motor and said power source.

11. The apparatus of claim 1 wherein said pump has graphalloy bearings.

12. The apparatus of claim 3 wherein said power lead has elastomers that are impervious to carbon dioxide permeation.

13. The apparatus of claim 10 wherein said power lead has elastomers that are impervious to carbon dioxide permeation.

* * * * *